US009646507B2

(12) United States Patent
Reinke et al.

(10) Patent No.: US 9,646,507 B2
(45) Date of Patent: May 9, 2017

(54) ROTORCRAFT COLLISION AVOIDANCE SYSTEM AND RELATED METHOD

(71) Applicant: Orbital ATK, Inc., Dulles, VA (US)

(72) Inventors: Thomas Reinke, Clearwater, FL (US); John R. Kenyon, Safety Harbor, FL (US)

(73) Assignee: Orbital ATK, Inc., Plymouth, MN (US)

( * ) Notice: Subject to any disclaimer, the term of this patent is extended or adjusted under 35 U.S.C. 154(b) by 99 days.

(21) Appl. No.: 14/930,376

(22) Filed: Nov. 2, 2015

(65) Prior Publication Data

US 2016/0111008 A1 Apr. 21, 2016

Related U.S. Application Data

(63) Continuation of application No. 14/162,476, filed on Jan. 23, 2014, now Pat. No. 9,177,482.

(51) Int. Cl.

| | |
|---|---|
| ***G08G 5/04*** | (2006.01) |
| ***G06T 7/20*** | (2006.01) |
| ***G06K 9/00*** | (2006.01) |
| ***G06T 7/60*** | (2017.01) |
| ***G08G 5/00*** | (2006.01) |
| ***G06K 9/62*** | (2006.01) |
| *G06K 9/20* | (2006.01) |

(52) U.S. Cl.

CPC ........... *G08G 5/04* (2013.01); *G06K 9/00624* (2013.01); *G06K 9/6202* (2013.01); *G06T 7/20* (2013.01); *G06T 7/60* (2013.01); *G08G 5/0008* (2013.01); *G08G 5/045* (2013.01); *G06K 9/00785* (2013.01); *G06K 9/00805* (2013.01); *G06K 9/2018* (2013.01); *G06T 2210/21* (2013.01)

(58) Field of Classification Search

CPC ..... G06T 7/004; G06T 7/0042; G06T 7/0044; G06T 7/0051; G06T 7/0071; G06T 7/20; G06T 7/60; G06T 2207/30212; G06T 2207/30248; G06T 2207/30252; G06K 9/00201; G06K 9/00624; G06K 9/6202; G06K 2209/21; G06K 2209/23; G08G 5/04; G01S 13/9303

See application file for complete search history.

(56) References Cited

U.S. PATENT DOCUMENTS

| | | | | |
|---|---|---|---|---|
| 9,177,482 | B1 * | 11/2015 | Reinke et al. | G08G 5/04 382/100 |
| 2010/0085236 | A1 | 4/2010 | Franceschini et al. | 342/30 |
| 2010/0292868 | A1 | 11/2010 | Rotem et al. | 701/2 |
| 2010/0299067 | A1 | 11/2010 | McCollough et al. | 701/301 |
| 2014/0139366 | A1 | 5/2014 | Moses et al. | G01S 7/41 |

* cited by examiner

*Primary Examiner* — Andrew W Johns
(74) *Attorney, Agent, or Firm* — TraskBritt

(57) ABSTRACT

A method of operating a rotorcraft collision avoidance system is provided. The method includes determining a unique characteristic of a detected rotorcraft, determining the actual length of a first rotor based at least in part on the determined unique characteristic of the rotorcraft, locating a major axis of the first rotor of the rotorcraft from a perspective of a home unit, from the perspective of the home unit, determining an angular extent of the major axis of the first rotor, and determining the then current distance from the home unit to the rotorcraft based at least in part on the determined actual length of the first rotor and the corresponding angular extent.

20 Claims, 9 Drawing Sheets

ROTORCRAFT COLLISION AVOIDANCE SYSTEM AND RELATED METHOD

CROSS-REFERENCE TO RELATED APPLICATION

This application is a continuation of U.S. patent application Ser. No. 14/162,476, filed Jan. 23, 2014, now U.S. Pat. No. 9,177,482, issued Nov. 3, 2015, the disclosure of which is hereby incorporated herein in its entirety by this reference.

BACKGROUND

Currently, more military helicopters are lost each year to mid-air collisions with other helicopters than are downed by enemy fire. While the problem is not newly discovered, there has been little effort expended in finding practical solutions for military rotary wing aircraft, particularly, solutions that do not require additional equipment/systems to be installed on the platform (due to size, weight and power constraints).

For the reasons stated above and for other reasons stated below, which will become apparent to those skilled in the art upon reading and understanding the present specification, there is a need in the art for an effective and efficient helicopter collision avoidance system.

BRIEF SUMMARY

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a method of operating a rotorcraft collision avoidance system is provided. The method includes: determining a unique characteristic of a detected rotorcraft; determining the actual length of a first rotor based at least in part on the determined unique characteristic of the rotorcraft; locating a major axis of the first rotor of the detected rotorcraft from a perspective of a home unit; from the perspective of the home unit, determining an angular extent of the major axis of the first rotor; and determining the current distance from the home unit to the detected rotorcraft based, at least in part, on the determined actual length of the first rotor and the corresponding angular extent of the major axis of the first rotor.

In still another embodiment, a method of operating a rotorcraft detection system is provided. The method includes: taking a first set of images of at least one rotor of a rotorcraft over a first period of time with a sensor of a home unit; temporally filtering the first set of images; determining the frequency of the at least one rotor based on the temporally filtered first set of images; matching the determined frequency of the at least one rotor with a frequency of a known rotorcraft; determining an actual diameter of the at least one rotor based on the match; locating a major axis in the temporally filtered first set of images; determining an angular extent between each end of the major axis; and determining the then current distance between the sensor of the home unit and the rotorcraft based on the determined angular extent and the actual diameter of the at least one rotor.

In yet another embodiment, a rotorcraft collision avoidance system is provided. The rotorcraft collision avoidance system includes at least one imaging sensor, a controller, a memory and a communication device. The at least one imaging sensor is configured and arranged to capture images of nearby rotorcrafts. The controller is in communication with the at least one imaging sensor to receive the images from the at least one imaging sensor. The controller is further configured to process the captured images to determine distances to the rotorcrafts based on at least identifying the rotorcraft with the images, identifying a major axis of a main rotor of the rotorcraft with the images and determining an angular extent between each end of the major axis. The memory is in communication with the controller to store processed image data and instructions. In addition, the communication device is in communication with the controller. The communication device is configured and arranged to communicate the determined distance upon direction of the controller.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout the figures and the specification.

DETAILED DESCRIPTION

In the following detailed description, reference is made to the accompanying drawings, which form a part hereof and in which is shown by way of illustration, specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a system and method to determine the location of a rotorcraft (a vehicle that uses a prop for flight such as, but not limited to, helicopters, planes with propellers or any other type of craft (vehicle) that uses a rotor (propeller) for movement) in relation to a position (home unit) to help prevent crashes.

Embodiments determine the type of aircraft and length of the rotor (diameter of the rotor) with the use of one or more sensors. Embodiments further determine, from a perspective of a home unit, a subtended angle corresponding to the diameter of the rotor. From this data, a determination of the location of the rotorcraft in relation to a home unit position is determined. If a subsequent determination of the location of the rotorcraft indicates that the rotorcraft is encroaching, evasive maneuvers can be employed to prevent a crash. Moreover, in embodiments, when it is determined that a rotorcraft is on a collision course (or even a near miss); it alerts a pilot and provides a bearing angle to the potential threat. Some embodiments implement sensors already used with the rotorcraft to make a distance determination. For example, most military helicopters are equipped with defensive systems that are capable of detecting when the helicopters are being engaged by non-friendly sources by using thermal imaging sensors. An example of such a defense system is the AN/AAR-59 Joint and Allied Threat Awareness System (JATAS) from Alliant Techsystems Inc. Embodiments extend baseline capabilities of the defense system to include early recognition of projected trajectory intersections with neighboring helicopters and alert the aircrew to potential mid-air collisions. A benefit to the embodiments that incorporate existing sensing equipment is that the system is unlikely to encounter additional issues typically associated with introducing a new system onto a military helicopter.

Figure 1:
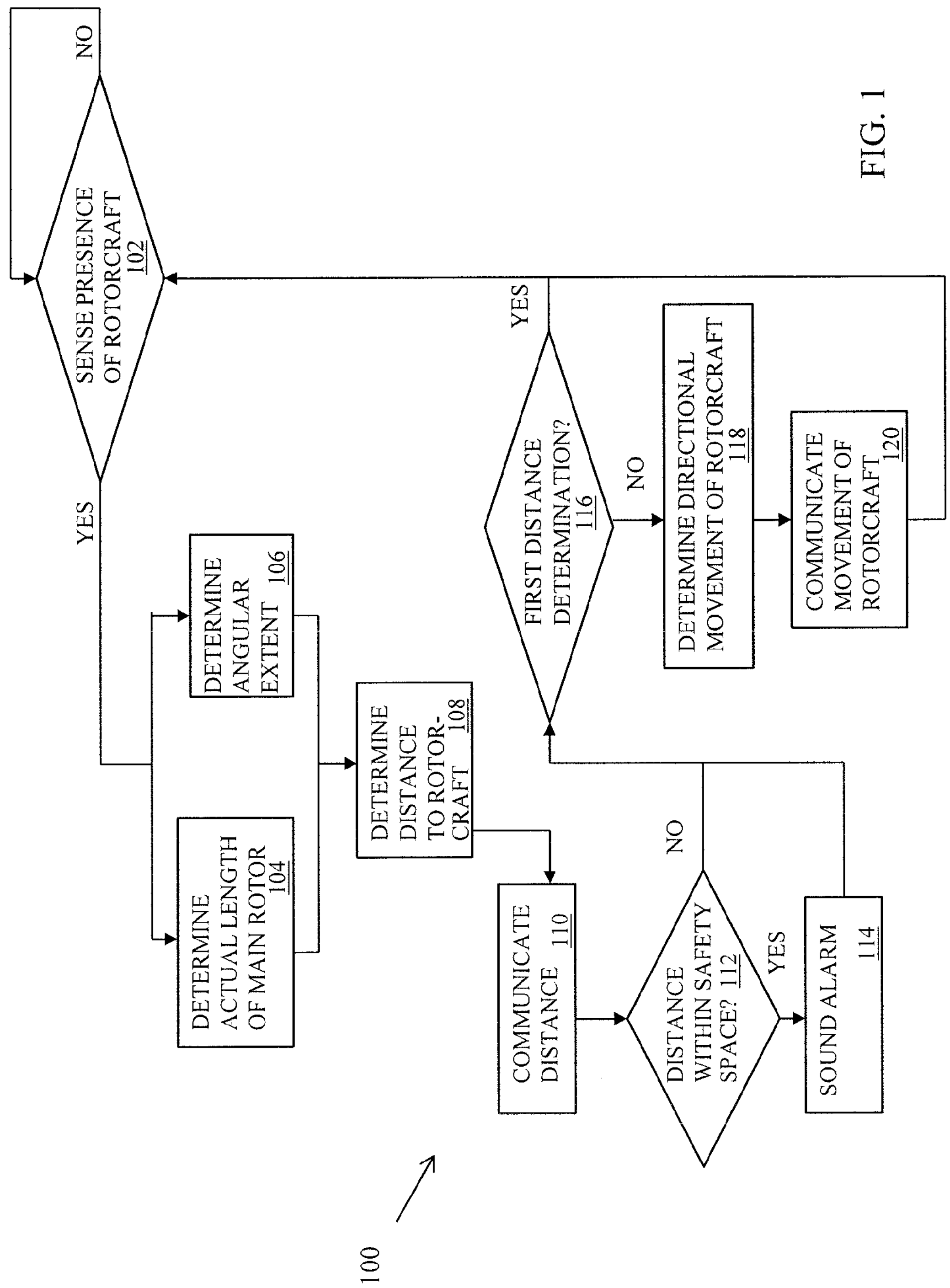
FIG. 1 is a collision avoidance flow diagram of one embodiment of the present invention.
Figure 2:
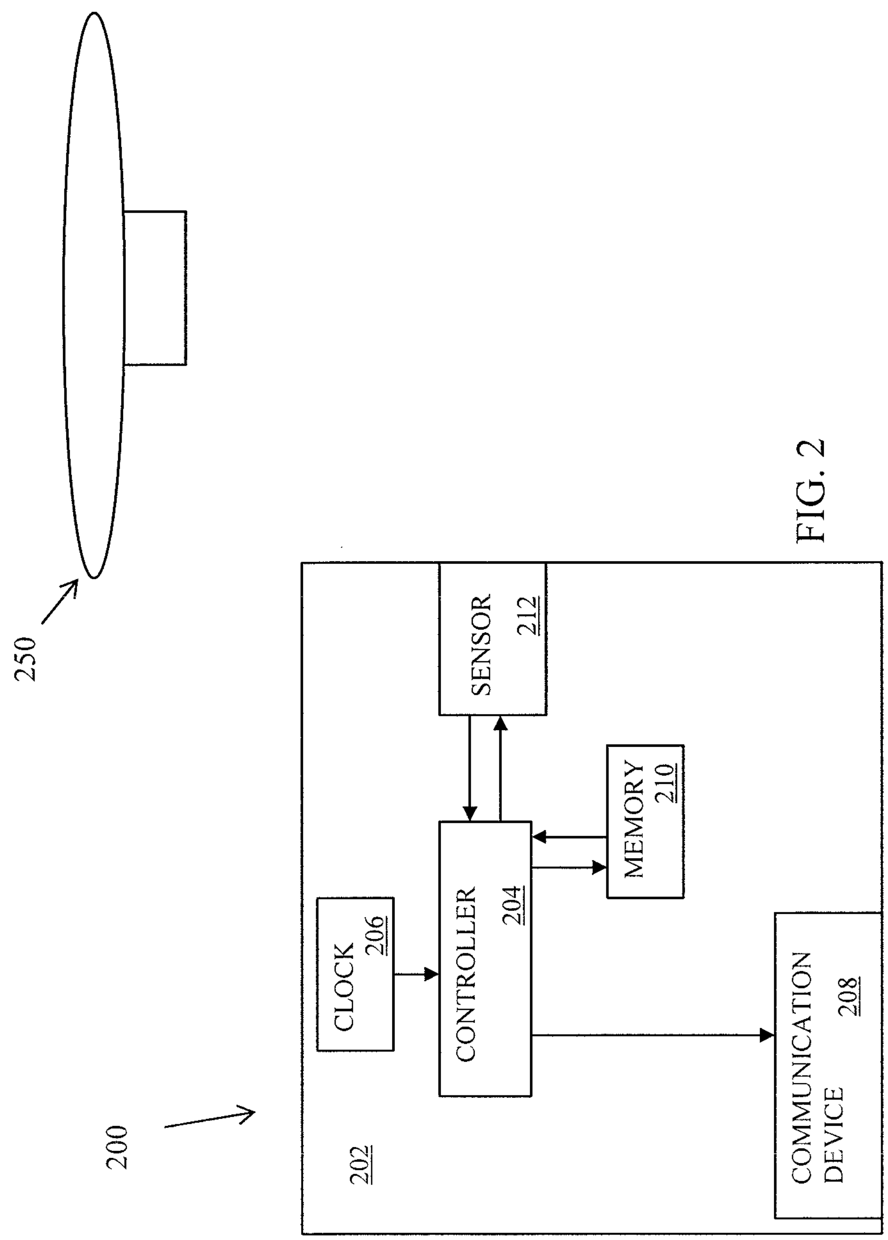
FIG. 2 is a block diagram of a collision avoidance system of one embodiment that would implement the collision avoidance flow diagram of FIG. 1.

Referring to FIG. 1, a collision avoidance flow diagram 100 of one embodiment is illustrated. The collision avoidance flow diagram 100 provides an overview of an application of a collision avoidance method with a collision avoidance system of an embodiment. An example block diagram collision avoidance system 200 is illustrated in FIG. 2. As FIG. 1 illustrates, the system starts by first detecting a presence of a rotorcraft (102). In one embodiment, this would be done with a sensor, such as sensor 212 of the collision avoidance system 200 of FIG. 2. An example sensor 212 is a Mid-Wave Infrared (MWIR) imaging sensor, which is capable of capturing images even in the dark and even in weather conditions such as, but not limited to, clouds, rain, hail, dust, etc. Other types of sensors can be used to detect the presence of nearby rotorcraft such as, but not limited to, radar systems, acoustic systems, etc. Once a rotorcraft 250 has been detected (102), the process as set out in FIG. 1 determines the actual length of a main rotor of the rotorcraft 250 (which is further described in detail below) (104) and determines the then current angular extent to the main rotor of the rotorcraft 250 (which is also further described in detail below) (106). Knowing the actual length of the main rotor and the measured angular extent, the distance to the rotorcraft 250 can be determined (this determination is also further described in detail below) (108). In the embodiment of FIG. 2, a controller 204 that is in communication with the sensor 212 determines the distance based on instructions stored in memory 210.

Once the distance is determined, the distance is communicated (110) as illustrated in FIG. 1. In the collision avoidance system 200 of FIG. 2, the controller 204 is configured to direct a communication device 208 to communicate the distance information. The communication device 208 may be a display, a speaker, a combination of both, or any other type of device that can convey a message about the distance to a user. The distance is the distance between the sensor 212 of a home unit 202 and the rotorcraft 250. The home unit 202 may be another rotorcraft, such as another helicopter, another type of aircraft, vehicle or even a stationary structure. In the example embodiment of FIG. 1, if it is determined the distance is within a safety space of the home unit 202, an alarm is activated. The alarm may be implemented by the communication device 208. The alarm provides the home unit 202 with a warning that evasive actions are needed immediately to avoid a collision. As the collision avoidance flow diagram 100 illustrates, this embodiment then determines if the then current distance is the first distance determined by the collision avoidance system 200 for the rotorcraft (116). If it is the first determined distance for the rotorcraft, the process continues at (102). Each time a distance is determined it is stored in memory 210 of the collision avoidance system 200. If it is determined (116) that it is not the first distance to be determined, the controller 204 uses data relating to the prior determined distance and data relating to the then current distance to determine the then current direction of travel of the rotorcraft (118) in relation to the home unit 202. In particular, this is done in an embodiment with knowledge of the rotor diameter, the angle of extent of the major axis to the main rotor of the rotorcraft and a pointing direction. With this information, an estimated location of the rotorcraft in relation to the home unit at a specific time can be determined. By comparing the estimated location of the rotorcraft at two different times the direction of travel is determined. The direction of travel is then communicated via the communication device 208 (120). As illustrated in FIG. 1, the process then continues at step 102, so the distance and direction of the rotorcraft 250 is monitored until it is out of range of the sensor 212. Timing of the collection of data, such as with images, by the sensor and the operation of the controller 204 is provided by a clock 206, as illustrated in FIG. 2.

The methods and techniques described herein are implemented by one or more computer systems such as the computer system employed in the collision avoidance system 200 of FIG. 2. Embodiments of the computer systems may be implemented in digital electronic circuitry, or with a programmable processor (for example, a special-purpose processor or a general-purpose processor such as a computer), firmware, software, or combinations of the above. Apparatus embodying these techniques may include appropriate input and output devices, a programmable processor, and a storage medium tangibly embodying program instructions for execution by the programmable processor. A process embodying these techniques may be performed by a programmable processor configured to execute a program of instructions in order to perform desired functions by operating on input data and generating appropriate output data. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory (ROM) and/or a random access memory (RAM). Storage devices suitable for tangibly embodying computer program instructions and data include all forms of memory including, by way of example, non-volatile memory, semiconductor memory, such as erasable programmable read-only memory (EPROM), electrically erasable programmable read-only memory (EEPROM), and Flash memory; magnetic disks such as internal hard disks and removable disks; magneto-optical disks; and CD-ROM discs. Any of the foregoing may be supplemented by, or incorporated in, specially designed application-specific integrated circuits (ASICs).

Figure 3A:
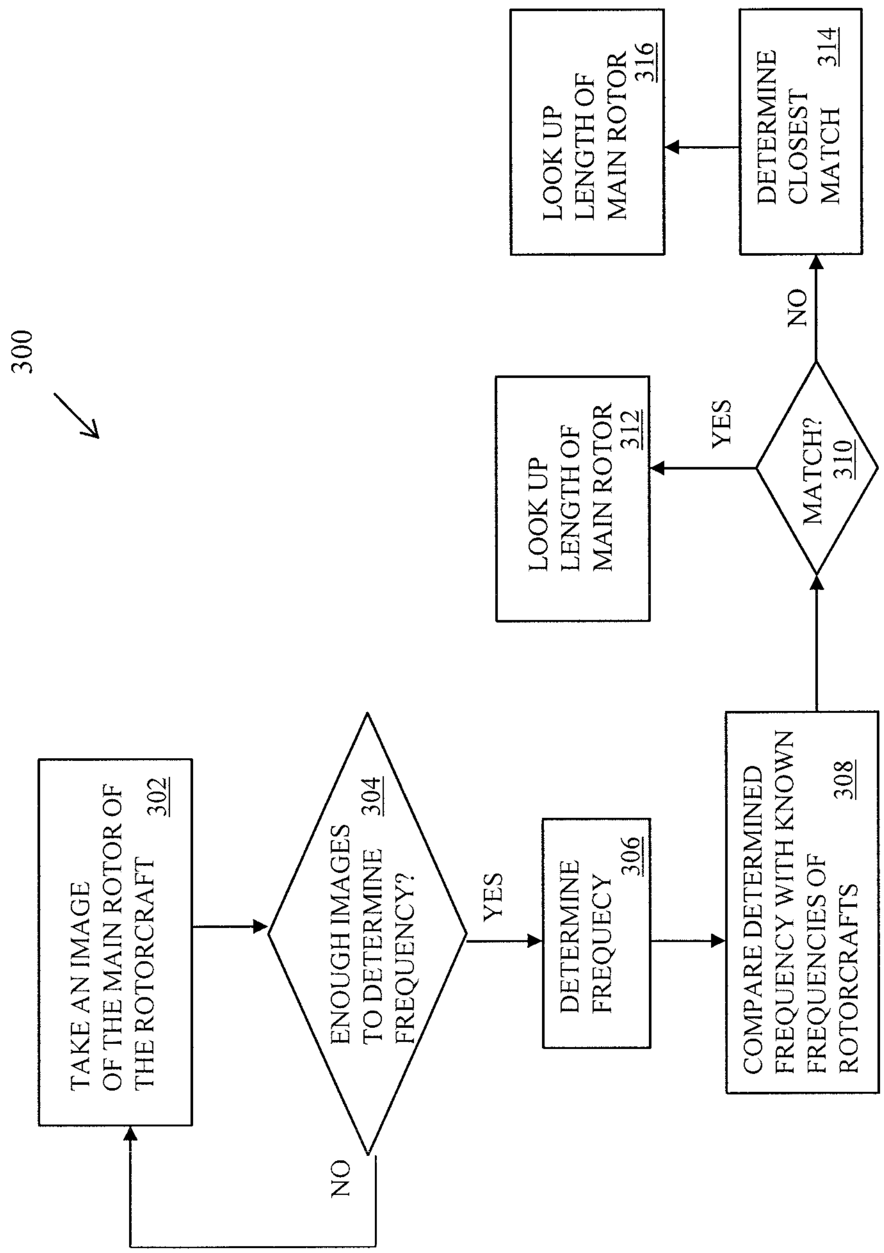
FIG. 3A is a characteristic determination flow diagram of one embodiment of the present invention.
Figure 3B:
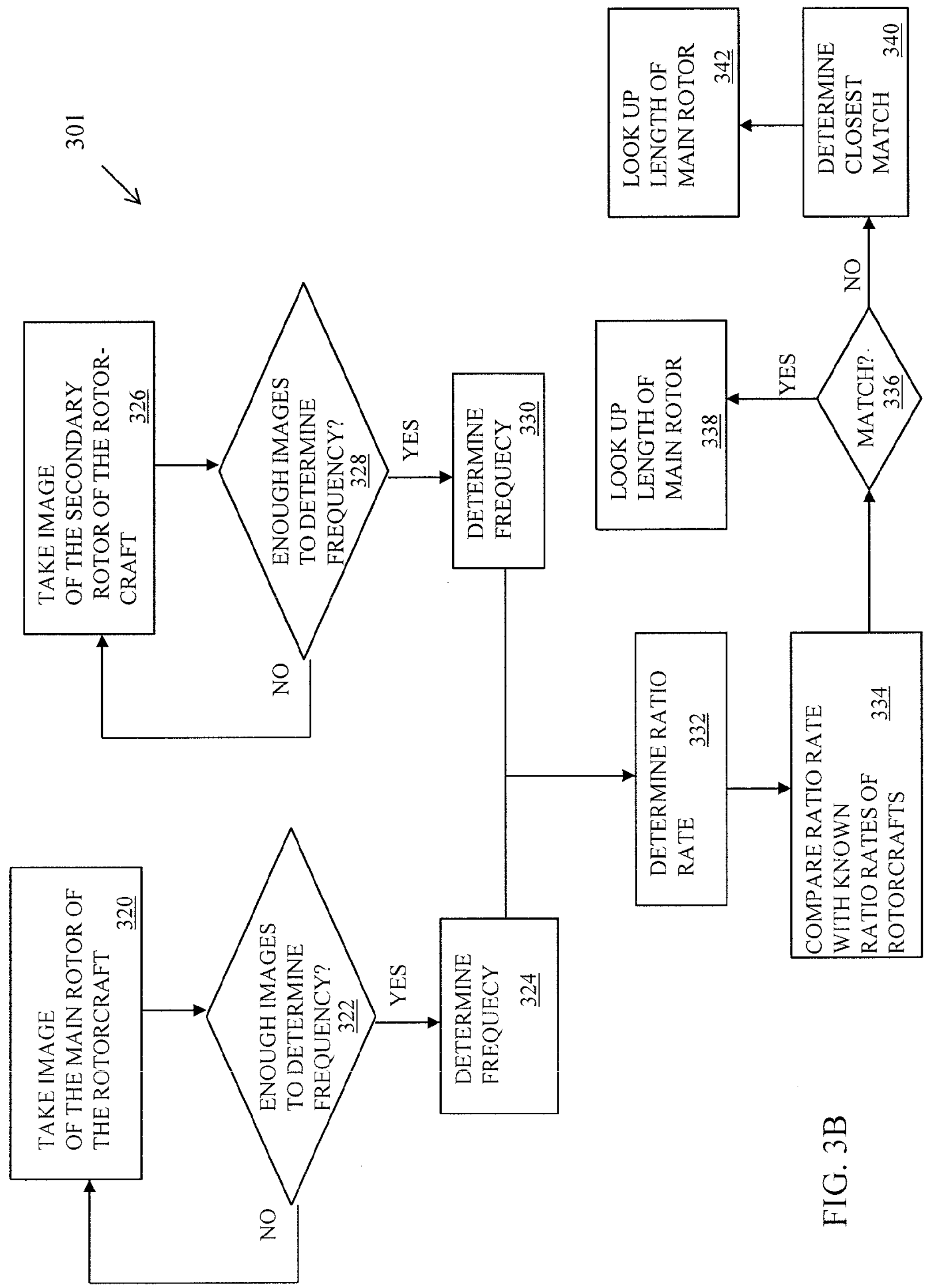
FIG. 3B is another characteristic determination flow diagram of another embodiment of the present invention.
Figure 4A:
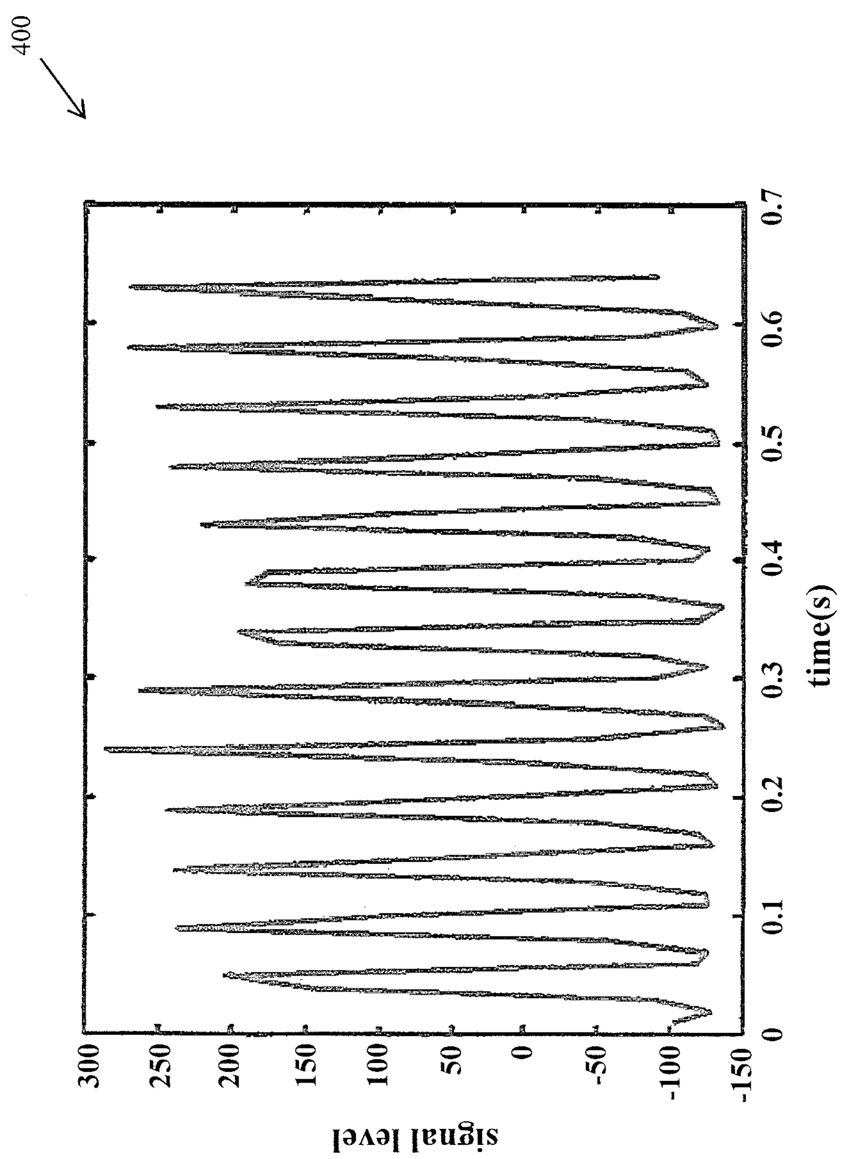
FIG. 4A is a temporal graph example illustrating a temporal signal level of a single pixel over a period of 640 ms.
Figure 4B:
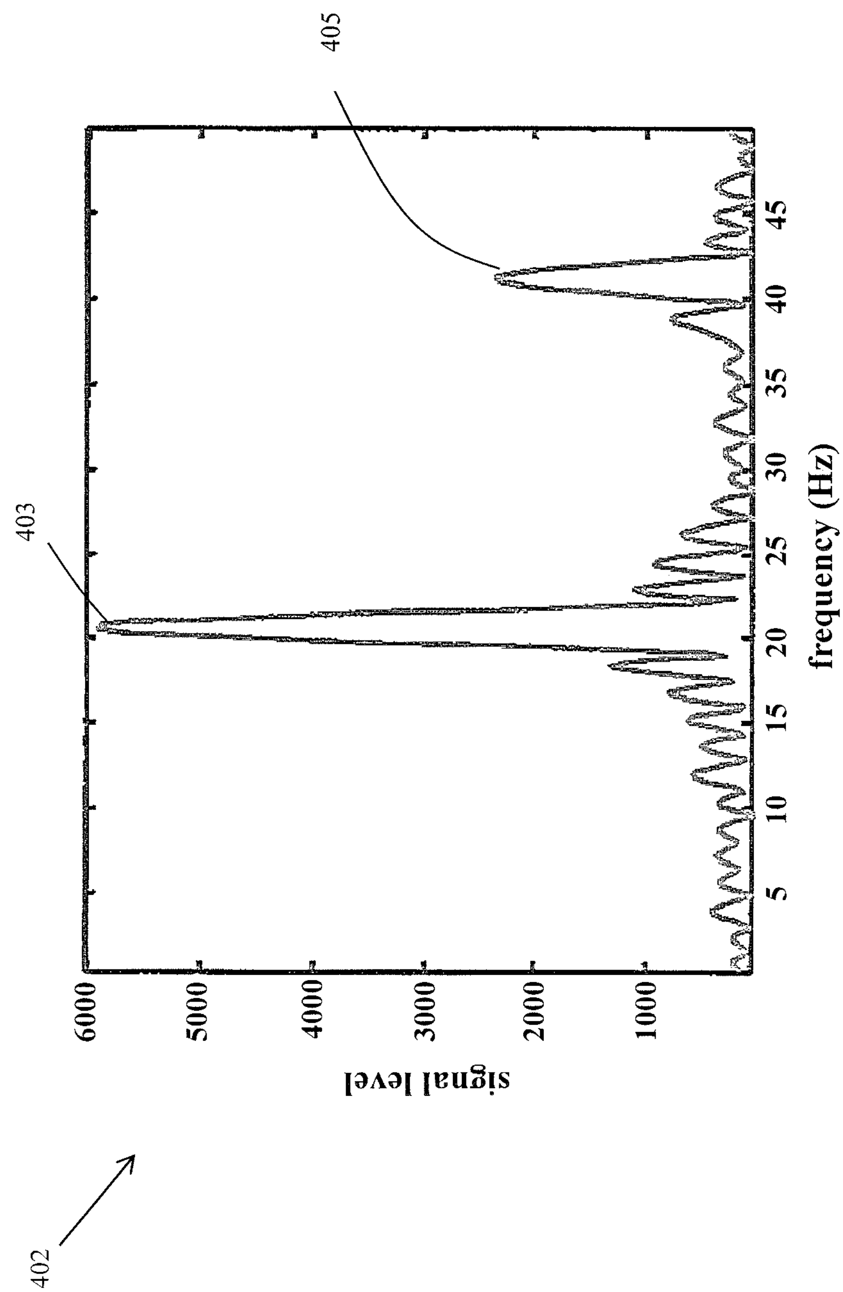
FIG. 4B is a spectral signature graph of the corresponding pixel in the temporal graph of FIG. 4A.

The actual length of the rotor is determined (104) by measuring one or more characteristics of the rotorcraft with a sensor and comparing the measured results with known characteristics of specific rotorcrafts. Once the specific type of rotorcraft is identified, the length of the rotor can be determined by knowing the specifications of the rotorcraft. Example embodiments that measure characteristics of the rotorcraft to determine actual length of the rotor are illustrated in FIGS. 3A and 3B. In the example embodiments, the characteristic measured is the frequency of one or more rotors of the rotorcraft. Each specific rotorcraft has its own rotor frequency (or rotor rate) during flight. The frequency is dependent, at least in part, on the size and weight of the craft and the number of blades that make up the rotor for the aircraft, which will be different for each rotorcraft. Referring to FIG. 3A, a characteristic determination flow diagram 300 of one embodiment is illustrated. This embodiment implements an image sensor (such as the MWIR discussed above). As illustrated, an image of the main rotor of a rotorcraft is taken (302). It is then determined if enough images have been taken to determine the frequency (304). If there is not, another image is taken at step (302). In one embodiment, images are recorded over a select period of time and at a select image rate to ensure enough images have been taken. In one embodiment, a single pixel in the images taken over the select period of time is analyzed to determine the frequency of the rotor. In particular, the temporal and spectral signature of the single observed pixel over the select period of time is analyzed. For example, referring to FIG. 4A, a temporal graph 400 illustrating a temporal signal level of a single pixel over a period of 640 ms is illustrated. Moreover, a corresponding spectral signature graph 402 of the pixel is shown in FIG. 4B. The spectral signature graph 402 illustrates spectral signal level vs. frequency. As illustrated, the frequency (or rotor rate), in this example, is about 20.51 Hz (first hump 403 of graph 402). FIG. 4B also illustrates a second hump 405, which is a first harmonic of the fundamental frequency. Periodic signals that are not perfect sinusoidal waves are composed of multiple sinusoidal waves of frequencies at multiple harmonics of the fundamental frequency. In this case, the fundamental frequency is about 20.5 Hz and the first harmonic frequency is about 41 Hz. Once you determine the frequency (or rotor rate) (306), the measured frequency of the rotor is compared with known frequencies of rotorcrafts (308), as illustrated in FIG. 3A. In an embodiment, a frequency (rotor rate) of a known rotorcraft is stored in a table in memory 210 along with corresponding rotor lengths. If there is a match (310), the length of the rotor is looked up in the table in memory (312). In an embodiment, if there is not a match at (310), it is determined which is the closest frequency match (314) in the table and the length associated with the closest frequency is then provided (316).

In the characteristic determination flow diagram 301 of FIG. 3B, not only the frequency of a first main rotor is looked at to determine the rotorcraft, but the frequency of a secondary rotor (such as a tail rotor of a helicopter) is determined. In this embodiment, a ratio rate between the frequencies of the main rotor and the secondary rotor is used to identify known rotorcraft and, hence, determine the actual length (diameter) of the main rotor. As with the first embodiment, this embodiment takes images of the first main rotor of the rotorcraft (320). Once there are enough images taken (322), the frequency of the main rotor is determined (324). As discussed above, in an embodiment, the images are MWIR images and temporal and spectral signatures of a single observed pixel of the imaged main rotor over the select period of time are analyzed to determine the frequency. Images are also taken of the secondary rotor (326). Once enough images are taken (328), the frequency of the secondary rotor is determined (330), as described above and shown in FIGS. 3A and 3B. In one embodiment, a single set of images is used that captures both the main rotor and the secondary rotor. With this embodiment, a select pixel associated with the main rotor and a select pixel associated with the secondary rotor are analyzed separately over time to determine the different frequencies. Once the frequencies have been detected, a ratio rate between the frequencies is determined (332). The determined ratio rate is then compared with known ratio rates of rotorcrafts (334). If there is a match (336), the actual length of the main rotor corresponding to the ratio rate is looked up in a table (338). In one embodiment, if there is not a match (336), the closest match of the ratio rate is determined (340) and the length of main rotor of the closest match is then looked up (342).

Figure 5:
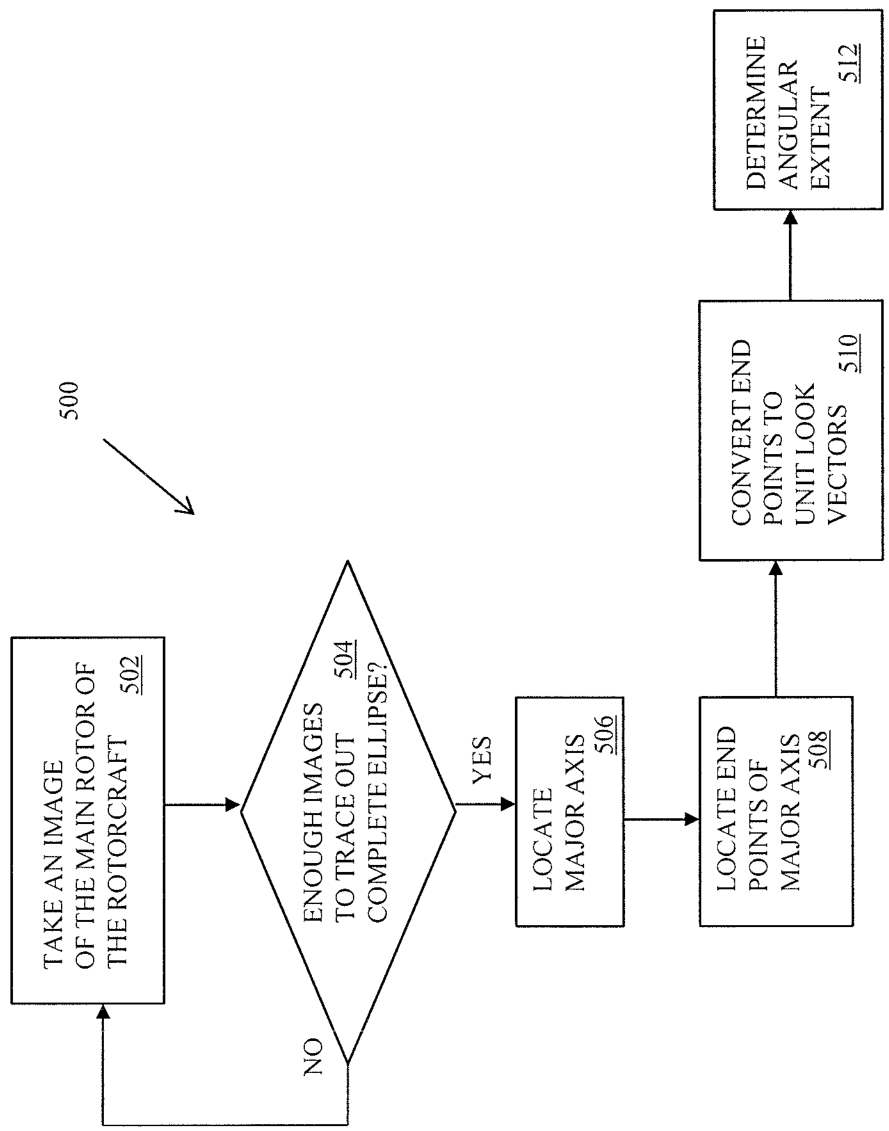
FIG. 5 is an angular extent flow diagram of an embodiment of the present invention.
Figure 6A:
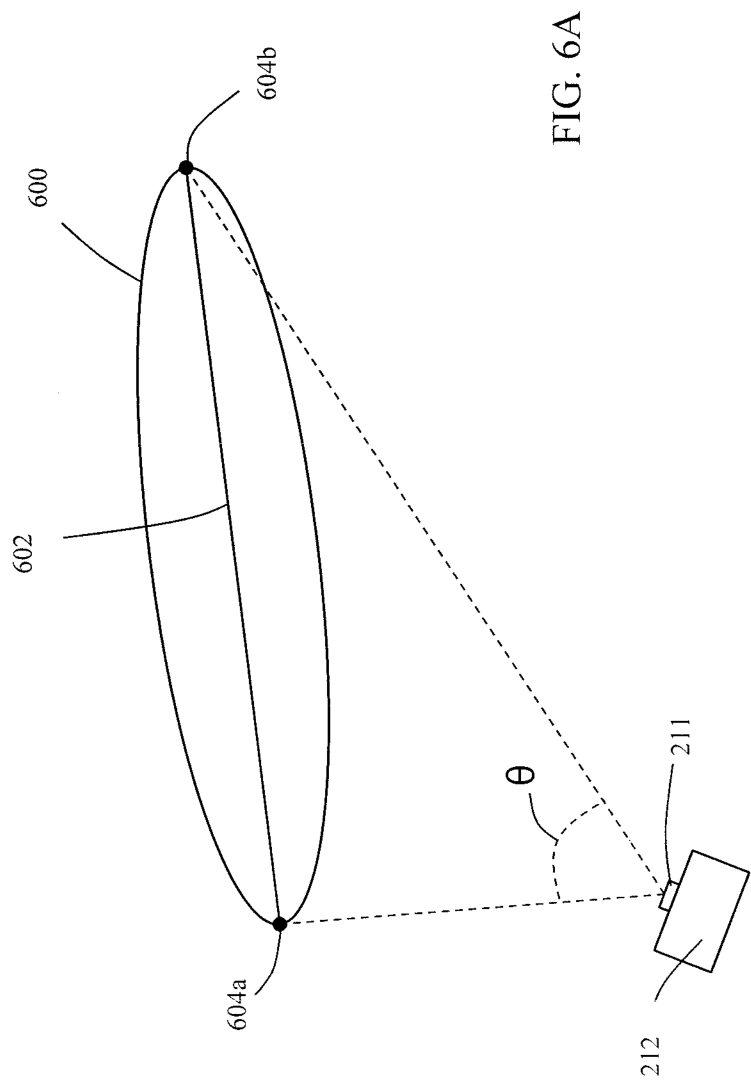
FIG. 6A is an example ellipse with a major axis and sensor of one embodiment of the present invention.

As discussed above in regard to FIG. 1, not only is the actual length (diameter) of the main rotor determined but also an angular extent of the main rotor is needed (106). Embodiments use the fact that the angular extent θ (shown in FIG. 6A) has a relationship that is dependent on the distance between the image sensor 212 and the rotorcraft 250. The larger the angular extent θ, the closer the rotorcraft 250 is to the image sensor 212 of the home unit 202. An example angular extent flow diagram 500 is illustrated in FIG. 5. As illustrated, the angular extent flow diagram 500 starts by taking images of the main rotor (502). In one embodiment, an MWIR sensor is used to take the images. Moreover, in some embodiments the same images used to determine the angular extent are used to determine the frequency and actual distance of the main rotor as discussed above. The images are collected until the images, temporally filtered, trace out a complete ellipse (504). An ellipse is a representation of the main rotor from the perspective of the image sensor. The major axis of the ellipse subtends the diameter of the rotor, independent of the orientation of the rotor relative to the sensor 212, is located at (506). An example ellipse 600 with a major axis 602 is illustrated in FIG. 6A. In one embodiment, end points 604*a* and 604*b* of the major axis 602 are located (508) and used to determine the angular extent θ (or subsumed angle) with a trigonometry relationship. In the angular extent flow diagram 500 of FIG. 5, the end points 604*a* and 604*b* of FIG. 6A are first converted to unit look vectors (510) using knowledge of lens distortion of the lens 211 (shown in FIG. 6A) of the image sensor 210. In some embodiments, for each pixel in the image there is going to be a mapping to a vector that points to a particular direction. So, each end point maps to a vector associated to each respective pixel. The angular extent is determined (512) as the inverse cosine of the inner product (or "dot" product) of the vectors in this example. Given two vectors (x1, y1, z1) and (x2, y2, z2), the inner product is the number x1×x2+y1×y2+z1×z2.

Figure 6B:
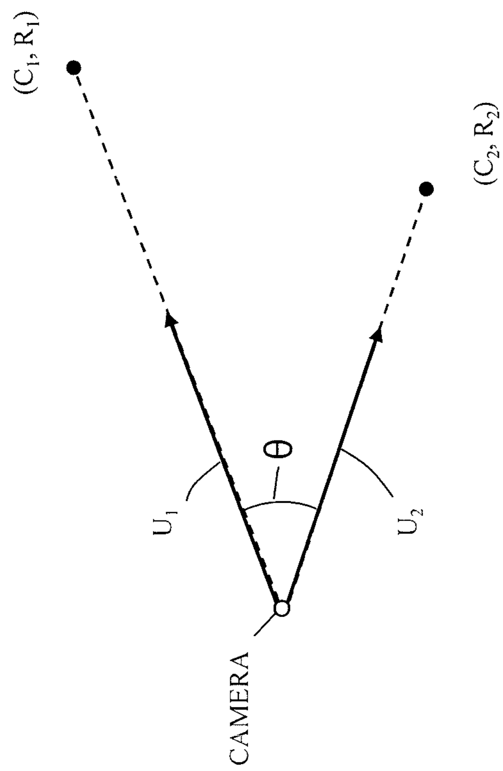
FIG. 6B is an illustration of vectors used to determine an angular extent in an embodiment of the present invention.

In particular, in this embodiment, each pixel in an image, whether it is formed using a consumer digital camera or a military-grade infrared sensor, corresponds to a specific point in three-dimensional space. Therefore, each pixel corresponds to a vector that originates at the sensor and points in the direction of the object represented by that pixel. The distance to the object is unknown; however, so only the direction of the vector is known. Since each pixel corresponds to a different part of the 3D scene, each pixel corresponds to a unique pointing vector. The mapping from pixel location to pointing vector may be determined during the design process or by measurement. Each component of the sensor, including the lens, affects the mapping. Assuming the sensor is rigid, the determination of this mapping is a one-time process. Given two pixel locations ($C_1$, $R_1$) and ($C_2$, $R_2$) (C and R indicate column and row, respectively), two corresponding unit vectors $U_1$ and $U_2$ are determined based on this mapping. The angle between these vectors, θ, is calculated using $\theta=\cos^{-1}(U_1\times U_2)$. This is illustrated in FIG. 6B.

In yet another embodiment, the determination of the actual distance of the main rotor is determined using one of the techniques to determine the measured distance of the major axis main rotor discussed in relation to FIGS. 5 and 6A and to also determine the measured major axis of the secondary rotor. A determined ratio of the major axis of the main rotor to the major axis of the secondary rotor is then used to compare with known ratios of main rotors to secondary rotors of rotorcraft to determine the actual distance of the rotor (diameter), similar to the matching process of FIGS. 3A and 3B above.

As briefly discussed above in regard to FIG. 1, once you have the actual length of the main rotor and the angular extent one can determine the distance between the home unit 202 and rotorcraft 250 (108). In one embodiment, the distance or range between the home unit 202 and the rotorcraft 250 is determined by the following equation:

$$L = \frac{d}{2\tan\frac{\theta}{2}} \approx d/\theta,$$

where L is the distance or range between the home unit and the rotorcraft, d is the actual diameter of the rotor and θ is the angular extent (subsumed angle). In some embodiments, the controller 204 implements the equation to determine the distance (range) between the home unit 202 and the rotorcraft 250. Moreover, as discussed above, in some embodiments, the distance of the rotorcraft is monitored over time until it is outside the range of the sensor. This is done by continuously capturing image sets (that provide the then current angular extent) with the sensor and monitoring the change in the angular extent over time.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is manifestly intended that this invention be limited only by the claims and the equivalents thereof.

What is claimed is:

1. A method, comprising:

capturing sensor data by a sensor of a home unit, the sensor data including one or more characteristics of a rotor of a rotorcraft;

determining an actual length of the rotor of the rotorcraft from sensor data;

determining an angular extent of a major axis of the rotor from a perspective of the home unit; and determining a distance from the home unit to the rotorcraft based, at least in part, on the determined actual length of the rotor and the angular extent.

2. The method of claim 1, wherein determining the actual length of the rotor of the rotorcraft is based, at least in part, on a determined frequency of the rotor from analyzing the sensor data.

3. The method of claim 2, wherein analyzing the sensor data includes analyzing at least one of a temporal signature or spectral signature of a select pixel over a series of images captured by the home unit.

4. The method of claim 2, wherein determining the actual length of the rotor of the rotorcraft includes comparing the determined frequency with a lookup table having known frequencies corresponding to known rotor lengths.

5. The method of claim 2, wherein determining the actual length of the rotor of the rotorcraft includes:

determining another frequency for another rotor of the rotorcraft;

determining a ratio for the frequency of the rotor and the another frequency of the another rotor; and comparing the ratio with a lookup table having known ratios corresponding to known rotor lengths of rotorcrafts having multiple rotors.

6. The method of claim 5, further comprising the home unit analyzing a same set of images for determining both the determined frequency of the rotor and the another frequency of the another rotor.

7. The method of claim 1, further comprising the home unit analyzing a same set of images for determining the actual length of the rotor of the rotorcraft and determining the angular extent of the major axis of the rotor of the rotorcraft.

8. The method of claim 1, wherein the distance from the home unit to the rotorcraft is approximately the actual length of the rotor divided by the angular extent determined from the sensor data.

9. The method of claim 1, further comprising determining a direction of travel for the rotorcraft by comparing the determined distance of the rotorcraft from at least two different points in time.

10. The method of claim 9, further comprising determining whether the rotorcraft and the home unit are on a collision path based, at least in part, on the determined distance and the direction of travel for the rotorcraft.

11. The method of claim 10, further comprising generating an alarm responsive to a determination that the rotorcraft and the home unit are on a collision path.

12. A method, comprising:

determining a distance from a home unit to a nearby rotorcraft based, at least in part, on comparing at least one measured characteristic of a captured image of the nearby rotorcraft with corresponding known characteristics of known rotorcrafts;

determining a direction of travel for the nearby rotorcraft; and generating an alarm if a collision course is determined for the home unit and the nearby rotorcraft.

13. The method of claim 12, wherein the at least one measured characteristic and corresponding known characteristics include an actual length of a rotor, and an angular extent of a major axis of the rotor from a perspective of the home unit.

14. A rotorcraft collision avoidance system for a home unit, comprising:

at least one imaging sensor configured and arranged to capture images of a nearby rotorcraft; and a controller operably coupled with the at least one imaging sensor, the controller configured to:

receive the captured images from the at least one imaging sensor; and process the captured images to:

identify a rotor of the nearby rotorcraft; and determine distance to the nearby rotorcraft based, at least in part, on a determined actual length of the rotor and a determined angular extent of a major axis of the rotor from a perspective of the home unit.

15. The rotorcraft collision avoidance system of claim 14, wherein the controller is further configured to determine the major axis of the rotor by temporally filtering the plurality of images to obtain an ellipse image of the rotor, and identifying a longest measurement across the ellipse image.

16. The rotorcraft collision avoidance system of claim 15, wherein the controller is further configured to determine the angular extent of the major axis of the rotor by locating pixels that correspond to end points of the major axis, converting the end point pixels to vectors, and determining an inverse cosine of an inner product of the vectors.

17. The rotorcraft collision avoidance system of claim 15, wherein the controller is further configured to determine the angular extent of the major axis of the rotor by counting a number of pixels along the major axis of the ellipse image to determine a pixel space, and applying a linear relationship to the pixel space.

18. The rotorcraft collision avoidance system of claim 14, further comprising a memory having at least one lookup table stored thereon with known frequencies corresponding to known actual rotor lengths used by the controller to determine the actual length of the rotor.

19. The rotorcraft collision avoidance system of claim 14, wherein the at least one imaging sensor includes at least one of a mid-wave infrared imaging sensor, a radar system, an acoustic system, a digital camera, or an infrared sensor.

20. The rotorcraft collision avoidance system of claim 14, wherein the home unit is selected from the group consisting of a rotorcraft, an aircraft, a vehicle, or a stationary structure.

* * * * *